United States Patent
Sanchez-Molinero et al.

(10) Patent No.: US 8,323,578 B2
(45) Date of Patent: Dec. 4, 2012

(54) METHOD FOR DEOXYGENATION OF SMOKES AND EQUIPMENT FOR IMPLEMENTING SAME

(75) Inventors: Ivan Sanchez-Molinero, Versailles (FR); Christophe Claeys, Limours (FR); Guillaume De Smedt, Antony (FR); Simon Jallais, Chaville (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 318 days.

(21) Appl. No.: 12/672,362

(22) PCT Filed: Jul. 24, 2008

(86) PCT No.: PCT/FR2008/051392
§ 371 (c)(1),
(2), (4) Date: Feb. 5, 2010

(87) PCT Pub. No.: WO2009/019396
PCT Pub. Date: Feb. 12, 2009

(65) Prior Publication Data
US 2012/0134904 A1   May 31, 2012

(30) Foreign Application Priority Data
Aug. 6, 2007 (FR) .................................. 07 56968

(51) Int. Cl.
*B01D 53/81* (2006.01)

(52) U.S. Cl. ........................................ 422/129; 422/187

(58) Field of Classification Search .................. 423/219; 422/129, 187
See application file for complete search history.

(56) References Cited

U.S. PATENT DOCUMENTS

| | | | |
|---|---|---|---|
| 4,364,915 A | 12/1982 | Proctor | |
| 5,266,283 A * | 11/1993 | Friesen et al. | 423/219 |

FOREIGN PATENT DOCUMENTS

| | | |
|---|---|---|
| EP | 1 156 012 | 11/2001 |
| GB | 1 246 483 | 9/1971 |

OTHER PUBLICATIONS

International Search Report for PCT/FR2008/051392, Feb. 2009.
Aspelund, et al., "Gas conditioning—The interface between CO2 capture and transport.," International Journal of Greenhouse Gas Control, vol. 1, No. 3, Jun. 16, 2007, pp. 343-354.
Johansson, et al., "A 300W laboratory reactor system for chemical-looping combustion with particle circulation," Fuel, IPC Science and Technology Press, vol. 85, No. 10-11, Jul. 2006, pp. 1428-1438.

* cited by examiner

*Primary Examiner* — Timothy Vanoy
(74) *Attorney, Agent, or Firm* — Elwood L. Haynes

(57) ABSTRACT

The invention relates to a method for the deoxygenation in a chemical loop of smokes resulting from oxidation-combustion reactions, that comprises: a first step during which the smokes are stripped from their oxygen by trapping the same by the oxidation of an oxygen-carrier material, thus producing a main flow of smokes with a reduced oxygen content; and a second step for also producing smokes that can join the main smoke flow and during which the material oxidized during the first step is reduced and regenerated by reaction with the fuel in order to be used again during said step. The invention also relates to an apparatus for implementing said method.

3 Claims, 3 Drawing Sheets

METHOD FOR DEOXYGENATION OF SMOKES AND EQUIPMENT FOR IMPLEMENTING SAME

CROSS-REFERENCE TO RELATED APPLICATIONS

This application is a §371 of International PCT Application PCT/FR2008/051392, filed Jul. 24, 2008.

BACKGROUND

The present invention relates to a chemical looping deoxygenation (CLDO) process for deoxygenating the flue gas resulting from oxy-fuel combustion reactions.

Combustion boilers for the generation of steam or electricity are operated in excess oxygen mode. The objective of this excess oxidizer is to ensure complete combustion of the fuel in order to achieve high efficiency of the plant and to obtain a low content of carbon compounds in the ash, thus enabling the ash to be utilized. The usual oxygen content in the flue gas at the outlet of the boiler is generally 2 or 3% by volume (on a dry basis).

For oxy-fuel combustion boilers intended for $CO_2$ capture, the operating mode is the same. However, there is the additional constraint of a limit to the oxygen content in the $CO_2$ produced. This is because, for EOR (enhanced oil recovery) applications, the oxygen is reputed to have negative effects on the point of injection into the reservoir (overheating of the injection point by an exothermic reaction with the oil) and on the redox conditions of the reservoir. EOR enables the useful lifetime of oil production fields to be extended and stands out as the most promising shorter-term application for storing very large quantities of captured $CO_2$.

In the context of the European project ENCAP, the limit set for this oxygen content in the case of EOR applications is 100 ppmv. For simple $CO_2$ storage, typically in deep aquifers, the oxygen is incorporated into a mass of inerts. The upper limit of these inerts is 4% by volume.

Among the several existing processes for limiting the presence of $O_2$ in oxy-fuel combustion flue gas are in particular the following: the inert separation process; the catalytic combustion process; the adsorption process; and, finally, the chemical looping combustion (CLC) process. Of these techniques, the process best suited to the intended objective is that of catalytic combustion. However, this process has several drawbacks:

- high consumption of fuel (hydrogen);
- usually accepted $O_2$ content as upper limit of 1.5% by volume; and
- risk of contaminating the catalyst (noble metals) by compounds resulting from the combustion of fossil fuels (coal/biomass/residues, etc.).

SUMMARY OF THE INVENTION

There is therefore a real need for a process in which:
- a consumption of hydrogen is reduced, or even eliminated, by substituting it with another fuel, such as natural gas for example;
- there is no upper limit as regards the content of oxygen to be treated; and
- a reactor not composed of noble metals is used, thereby making it possible, on the one hand, to reduce the cost associated with manufacturing the reactors and consequently the process costs and on the other hand, thereby enabling larger reactors to be produced more economically.

Surprisingly and unexpectedly, the filing company has found that it is possible to meet these requirements thanks to a chemical looping deoxygenation (CLDO) process for deoxygenating the flue gas resulting from oxy-fuel combustion reactions, which comprises:
- a first step during which said flue gas is stripped of its oxygen by trapping said oxygen via the oxidation of an oxygen transport material, thus producing a main stream of flue gas with a reduced oxygen content; and
- a second step also producing flue gas which can join the main flue gas stream and during which the material oxidized in the first step is reduced and regenerated by reacting with fuel so as to be used again in said first step.

Unlike the CLC process, the objective of which is to achieve complete combustion of the fuel in the regeneration reactor, the objective in the case of CLDO is to exhaust the oxygen content of the stream sent back into the oxidation reactor. Thus, the approach adopted changes from a CLC combustion or production process to a CLDO purification process.

The temperature for CLC is typically from 800 to 900° C., the upper limit being set by the agglomeration of the beds. Now, one of the advantages of CLDO is that it provides greater flexibility in relation to the operating temperature. This is because, as the process is a flue gas post-treatment process, it may typically be carried out at moderate, or even very low, temperatures. One of the benefits of working at very low temperature (<100° C.) is that a smaller and more concentrated volume of flue gas is treated (thanks to the steam condensing). Having said that, the CLDO process may also be envisaged at high temperature, especially when it is integrated into the hot portion of the flue gas path in the oxy-fuel boiler.

It is possible to work close to atmospheric pressure. However, a certain overpressure between 1 and 500 mbar may prove to be advantageous in order to avoid any unwanted air ingress.

In another embodiment, the deoxygenation process according to the invention is characterized in that the second step is furthermore completed by the addition of air, enriched air or oxygen and/or by a higher fuel flow rate.

Because of this addition of air and/or this higher fuel flow rate, it is possible to compensate for the endothermicity of the reduction reaction and thus raise the temperature within the reactor. This configuration also makes the operation more flexible and circumvents temperature constraints on regenerating the transporter.

In one particular embodiment, the deoxygenation process according to the invention is characterized in that the flue gas resulting from the second step can furthermore be oxidized in a post-oxidation chamber with an excess of oxygen so as to complete the oxidation/regeneration process.

In another embodiment, the deoxygenation process according to the invention is characterized in that said oxygen transport material is in the form of feeds or granules and comprises at least one element chosen from the group comprising iron, nickel, copper, cobalt, manganese, titanium, magnesium and mixtures thereof. One example of such materials is the ore called ilmenite which is found in nature and comprises a mixture of Fe and Ni.

In general, the oxygen transporter metals are in the initial oxidation state (0) in the oxidation reactor before the CLDO process is initiated. Once the flue gas has been injected, the oxidation reaction rate favored by the temperature enables these transporter metals to be oxidized i.e. to reach their highest level of oxidation, or an intermediate level of oxidation. At the same time, the $O_2$ content of the flue gas decreases. Once in the regeneration (or combustion) reactor, the carbon fuel, owing to the endothermic reaction, reduces the metal oxide, the metal resuming its initial oxidation state (0) or an intermediate oxidation state.

Although the process is cyclic, the oxygen transporter metals may undergo degradation over the course of the cycles. Periodic top-up with fresh materials and removal of spent materials are provided. One of the advantages of the CLDO process is that it is able to resist any contamination in the flue gas because of this periodic removal of transporter for the purpose of replacing it.

In another embodiment, the deoxygenation process according to the invention is characterized in that the fuel is typically gaseous, although it may also be solid or liquid, and is chosen from the group comprising hydrocarbons, coal, oil, biomass and gas, preferably natural gas. By using natural gas it is possible to obtain optimum performance at lower cost.

The deoxygenation process according to the invention is very suitable for oxy-fuel combustion flue gas consisting in % by volume of the compounds given in Table 1 below.

TABLE 1

| Compound | + | ++ | +++ |
|---|---|---|---|
| ON A WET BASIS | | | |
| $CO_2$ | 45% to 65% | 55% to 60% | 57.11% |
| $H_2O$ | 25% to 45% | 30% to 35% | 34.87% |
| $SO_2$ | 0.5% to 5% | 0.9% to 2.2% | 1.42% |
| $N_2$ | 0% to 5% | 1.5% to 3.5% | 2.77% |
| $O_2$ | 0% to 5% | 1.5% to 2.5% | 1.95% |
| Ar | 0% to 5% | 1% to 2.5% | 1.61% |
| ON A DRY BASIS | | | |
| $CO_2$ | 60% to 100% | 82% to 92% | 88.05% |
| $SO_2$ | 0.5% to 5% | 1.5% to 3.5% | 2.19% |
| $N_2$ | 0% to 10% | 3% to 6% | 4.27% |
| $O_2$ | 0% to 6% | 2% to 4% | 3.01% |
| Ar | 0% to 5% | 1.5% to 3.5% | 2.48% |

+: preferably;
++: more preferably;
+++ even more preferably

According to another embodiment, the deoxygenation process provides, after the deoxygenation treatment, a flue gas having a reduced $O_2$ content consisting of $H_2O$ and $CO_2$. Said reduced $O_2$ content in % by volume ranges from 0% to 8%, preferably from 0.001% to 0.2% and even more preferably is 0.01%.

The deoxygenation process may also provide nitrogen, argon, nitrogen oxides, sulphur oxides, carbon monoxide with volume contents of less than 10% and other minor compounds with volume contents of less than 0.1%.

To obtain this low flue gas oxygen content, the residence time in the oxidation reactor is long, so as to ensure a good degree of reaction while still using a reasonable amount of oxygen transporter materials. Thus, the residence time in the oxidation reactor is less than one minute, preferably of the order of a few seconds.

Another subject of the invention is a chemical looping deoxygenation plant for deoxygenating the flue gas resulting from oxy-fuel combustion reactions, which comprises at least:

an oxidation reactor, comprising an oxy-fuel combustion flue gas feed means, an oxygen-reduced flue gas recovery means and a means for injecting the oxidized material into the regeneration reactor;

a regeneration reactor comprising a means for feeding the oxidized material coming from the oxidation reactor, a fuel feed means and a means for regenerating the oxidized material;

optionally, a post-oxidation chamber at the outlet of the regeneration rector; and optionally, a means for feeding the regeneration reactor with air, said oxidation and regeneration reactors being mutually sealed as regards circulation of the gas.

In the CLC process, the key reactor is the regeneration reactor, whereas in the CLDO process the key reactor is the oxidation reactor. The latter reactor is therefore oversized (by about 20%) in order to ensure a residence time and a degree of reaction that guarantee almost complete removal of the oxygen from the recycled flue gas.

The oxidation and regeneration reactors may be circulating fluidized beds separated by solid traps. The invention may also be implemented using fixed bed reactors. Whatever the type of reactor used, it is essential to optimize the sealing between the two reactors. This sealing between the two reactors prevents any air ingress into the regeneration reactor, (and therefore avoids inerts being introduced into the flue gas stream) and prevents flue gas from being discharged into the oxidation reactor (thus avoiding loss of $CO_2$).

BRIEF DESCRIPTION OF THE DRAWINGS

Other aspects, objects, advantages and features of the invention will become apparent on reading the following non-restrictive description of the preferred methods of implementing the invention given by way of examples with reference to the following figures, in which.

DETAILED DESCRIPTION OF THE INVENTION

Figure 1:
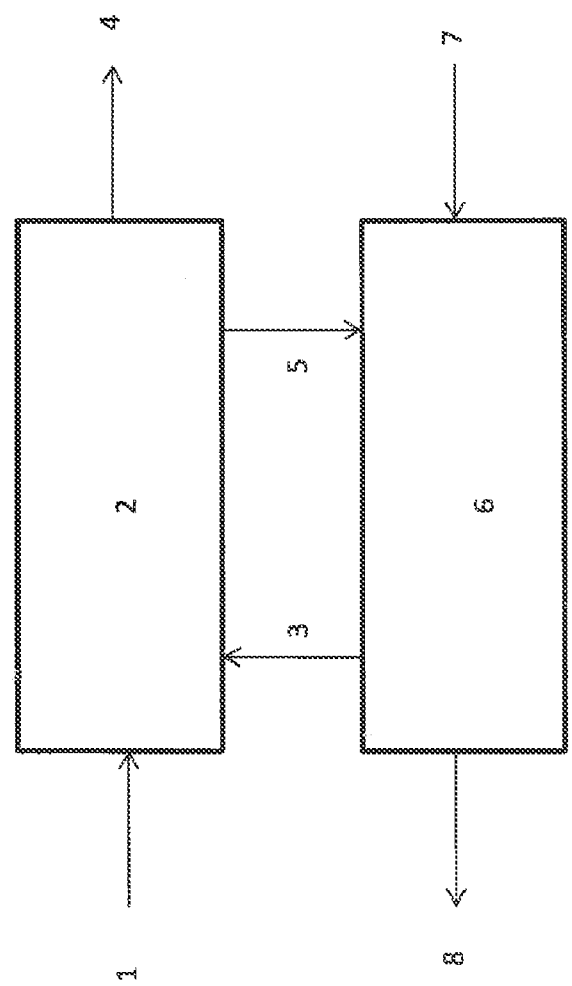
FIG. 1 is a schematic representation of the deoxygenation process for air treatment according to the prior art.

The air deoxygenating process according to the prior art is illustrated in FIG. 1. In this figure, the air (1) is brought into contact with the oxygen transporter materials (2) in the oxidation reactor (3). Although exothermic, the reaction kinetics for oxidation of these metals is promoted by the temperature. Thus, the metals and the air are hot on entering this reactor. The residence time and the flow rate of the transporters are adapted so as to optimize the degree of oxidation reaction and the quantity of materials. Found at the outlet of the oxidation reactor are again oxygen-depleted air (or impure nitrogen) (4) and the oxidized form (5) of the transporter metal. This metal thus transports the "captured" oxygen into the oxidation reactor. The metal oxide (5) then passes into the regeneration or combustion reactor (6). Also injected thereinto is carbon fuel (7), which reduces the metal oxide to its oxidation state 0. This reaction is endothermic. At the outlet of the reactor are again the transporter metal (2), which passes into the oxidation reactor (3), and typical nitrogen-free combustion flue gas (8) consisting, as in the case of oxy-fuel combustion, predominantly of $CO_2$ and $H_2O$.

Figure 2:
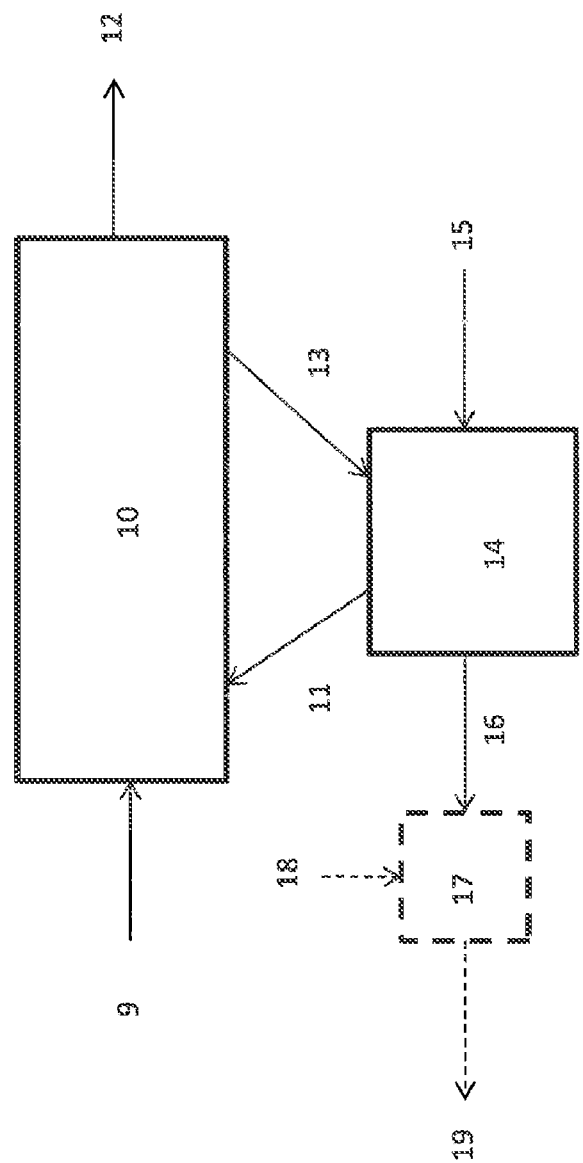
FIG. 2 is a schematic representation of the deoxygenation process for flue gas treatment according to the present invention, which furthermore may be supplemented with a post-oxidation chamber (shown dotted in the figure)

The chemical looping deoxydation process for deoxidizing flue gas resulting from oxy-fuel combustion reactions according to the invention is illustrated in FIG. 2. In this figure, the flue gas (9) resulting from oxy-fuel combustion reactions is brought into contact with the oxygen transporter materials (10) in the oxidation reactor (11). The granules of oxygen transporter material (10) trap the oxygen present in the said flue gas, making it possible to produce a main flue gas stream (12) of reduced oxygen content. The thus-oxidized material (13) is then reduced in the regeneration reactor (14) by the combustion of the fuel (15). Flue gas (16) is then produced at this step and then rejoins the main flue gas stream (12). The material (10) thus reduced in the regeneration step may then be reused in the oxidation reactor (11) in order once again to strip oxygen from the flue gas resulting from the oxy-fuel combustion reaction. This process may furthermore be supplemented with a post-oxidation chamber (17) which, when fed with excess air (18), serves to complete the combustion of the combustible compounds still present in the regeneration reactor flue gas. The flue gas (19) then produced, which has been contaminated by the influx of air, can no longer rejoin the main flue gas stream (12). In a complementary configuration of this system, the air stream (18) may be substituted with oxygen so that flue gas is not contaminated with inerts. In this case, the flue gas then produced may rejoin the main flue gas stream (12).

Figure 3:
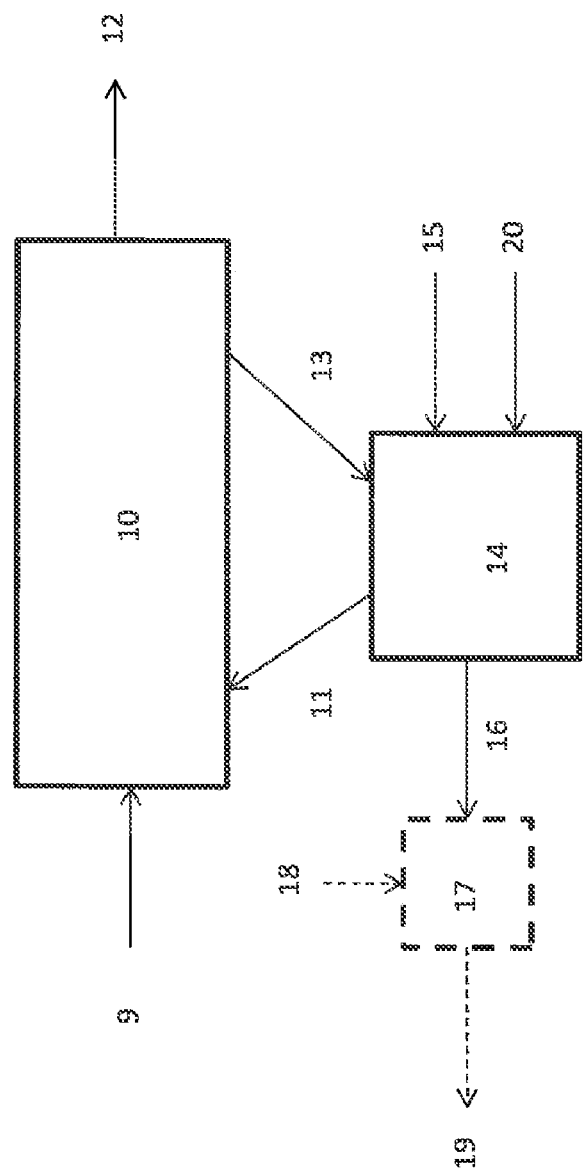
FIG. 3 is a schematic representation of another configuration of the deoxygenation process for flue gas treatment according to the present invention, which includes an optional addition of air and a higher fuel flow rate.

In the context of another configuration of the system illustrated in FIG. 3, there may optionally be an influx of air (20) into the regeneration reactor (14). If such is the case, the flue gas (16) produced can no longer rejoin the main flue gas stream, as they are also contaminated by the influx of fresh air.

EXAMPLES

Example 1

A stream of flue gas resulting from oxy-fuel combustion reactions was injected into an oxidation reactor with a flow rate of 141.65 kg/s (272190 $Nm^3$/h), said flue gas containing 2.19 wt % $O_2$ (flow rate: 3.10 kg/s).

In this reactor, having a capacity for 372 kg of granules, the flue gas was brought into contact with ilmenite granules for 10 seconds. The degree of oxygen capture was thus 10% by weight and the flue gas discharged from this reactor at a flow rate of 138.55 kg/s was composed in particular of carbon dioxide and water.

The oxidized ilmenite granules were then reduced stoichiometrically in a regeneration reactor having a capacity of 186 kg of granules, fed with natural gas at a flow rate of 0.775 kg/s. The residence time of the granules in this reactor was 5 seconds. The flue gas produced at this step then joined the main flue gas stream.

The granule flow rate between the two reactors was 37.2 kg/s.

although the present invention has been described above by means of examples of the preferred embodiments thereof, it should be understood that it may be modified without departing from the spirit and the nature of the invention as defined in the appended claims.

What is claimed is:

1. A chemical looping deoxygenation plant for deoxygenating the flue gas resulting from oxy-fuel combustion reactions for implementing a chemical looping deoxygenation process for deoxygenating the flue gas resulting from oxy-fuel combustion reactions, which comprises:
    a first step during which said flue gas is stripped of its oxygen by trapping said oxygen via the oxidation of an oxygen transport material, thus producing a main stream of flue gas with a reduced oxygen content; and
    a second step also producing flue gas which can join the main flue gas stream and during which the material oxidized in the first step is reduced and regenerated by reacting with fuel so as to be used again in said first step,
wherein said chemical looping deoxygenation plant comprises:
    an oxidation reactor, comprising an oxy-fuel combustion flue gas feed means, an oxygen-reduced flue gas recovery means and a means for injecting the oxidized material into the regeneration reactor; and
    a regeneration reactor comprising a means for feeding the oxidized material coming from the oxidation reactor, a fuel feed means and a means for regenerating the oxidized material.

2. The chemical looping deoxygenation plant of claim 1, further comprising a post-oxidation chamber at the outlet of the regeneration rector.

3. The chemical looping deoxygenation plant of claim 1, further comprising a means for feeding the regeneration reactor with air, wherein the flue gas resulting from said regeneration reactor rejoins the oxygen-reduced flue gas from said oxidation reactor.

* * * * *